US012415944B2

(12) United States Patent
Fischer et al.

(10) Patent No.: US 12,415,944 B2
(45) Date of Patent: Sep. 16, 2025

(54) USE OF NANOPARTICLE COMPOSITIONS AS HEAT TRANSFER FLUIDS IN BATTERY OR OTHER ELECTRICAL EQUIPMENT SYSTEMS

(71) Applicants: Raphaela Schrantz, Siefersheim (DE); Cornelia Schrantz, Mörsfeld (DE); Evonik Operations GmbH, Essen (DE)

(72) Inventors: Ulrich Fischer, Mömbris (DE); Daniel Neß, Hanau (DE); Stephan Wieber, Karlsruhe (DE); Michael Gerhard Hagemann, Shanghai (CN); Günter Schmitt, Darmstadt (DE); Stefan Heberer, Offenbach (DE); Jennifer Schrantz, Wendelsheim (DE); Can Metehan Turhan, Dieburg (DE)

(73) Assignee: Evonik Operations GmbH, Essen (DE)

( * ) Notice: Subject to any disclaimer, the term of this patent is extended or adjusted under 35 U.S.C. 154(b) by 748 days.

(21) Appl. No.: 17/616,769

(22) PCT Filed: Jul. 13, 2020

(86) PCT No.: PCT/EP2020/069746
§ 371 (c)(1),
(2) Date: Dec. 6, 2021

(87) PCT Pub. No.: WO2021/009116
PCT Pub. Date: Jan. 21, 2021

(65) Prior Publication Data
US 2022/0306924 A1 Sep. 29, 2022

(30) Foreign Application Priority Data
Jul. 17, 2019 (EP) .................................... 19186777

(51) Int. Cl.
*C09K 5/10* (2006.01)
*C08F 212/08* (2006.01)
*C08F 220/18* (2006.01)
*C08F 220/60* (2006.01)
*C08F 236/06* (2006.01)
*C08K 3/04* (2006.01)
*C08K 3/38* (2006.01)
*B82Y 30/00* (2011.01)

(52) U.S. Cl.
CPC .............. *C09K 5/10* (2013.01); *C08F 212/08* (2013.01); *C08F 220/1804* (2020.02); *C08F 220/1812* (2020.02); *C08F 220/60* (2013.01); *C08F 236/06* (2013.01); *C08K 3/041* (2017.05); *C08K 3/38* (2013.01); *B82Y 30/00* (2013.01); *C08K 2003/385* (2013.01)

(58) Field of Classification Search
None
See application file for complete search history.

(56) References Cited

U.S. PATENT DOCUMENTS

| 4,316,973 | A | 2/1982 | Kennedy |
| 4,859,210 | A | 8/1989 | Franz et al. |
| 8,067,349 | B2 | 11/2011 | Stohr et al. |
| 8,850,803 | B2 | 10/2014 | Brown |
| 10,954,466 | B2 | 3/2021 | Sirak et al. |
| 11,180,712 | B2 | 11/2021 | Wieber et al. |
| 11,198,833 | B2 | 12/2021 | Wieber et al. |
| 2004/0069454 | A1 | 4/2004 | Bonsignore et al. |
| 2008/0287326 | A1* | 11/2008 | Zhang ................ C10M 103/02 508/113 |
| 2010/0190671 | A1* | 7/2010 | Stoehr ................ C10M 143/12 526/319 |
| 2015/0048272 | A1 | 2/2015 | Rai et al. |
| 2016/0097017 | A1* | 4/2016 | Eisenberg ............ C10M 169/04 508/503 |
| 2016/0168442 | A1* | 6/2016 | Lievens .................... C09K 5/10 252/68 |
| 2020/0369977 | A1 | 11/2020 | Wieber et al. |

FOREIGN PATENT DOCUMENTS

| GB | 2270317 A | 3/1994 |
| JP | S63-175096 A | 7/1988 |
| WO | 2007/003238 A1 | 1/2007 |
| WO | 2013/115925 A1 | 8/2013 |
| WO | 2017/132122 A1 | 8/2017 |
| WO | 2018/019783 A1 | 2/2018 |
| WO | 2021/009115 A1 | 1/2021 |

OTHER PUBLICATIONS

Breuers et al., U.S. Appl. No. 18/245,796, filed Mar. 17, 2023.
U.S. Appl. No. 18/245,796, filed Mar. 17, 2023, Breuers et al.
International Search Report mailed on Sep. 11, 2020 in PCT/EP2020/069746 (4 pages).
Written Opinion mailed on Sep. 11, 2020 in PCT/EP2020/069746 (5 pages).
Ali et al., "A Review on Nanofluids: Fabrication, Stability, and Thermophysical Properties," copyright 2018, Jounral of Nanomaterials, Article ID 6978130, pp. 1-33 (34 pages).
Mang et al., "Lubricants and Lubrication," Wiley-VCH, Weinheim 2001 (3 pages).
Mortier et al., "Chemistry and Technology of Lubricants," copyright 1992, Springer Science+Business Media New York (3 pages).

(Continued)

*Primary Examiner* — Anthony J Frost
(74) *Attorney, Agent, or Firm* — Grüneberg and Myers PLLC

(57) ABSTRACT

The invention relates to the use of a nanoparticle composition as a heat transfer fluid in battery or other electrical equipment systems. The electrical equipment can be in particular electric batteries, electric motors, electric vehicle transmissions, electric transformers, electric capacitors, fluid-filled transmission lines, fluid-filled power cables, computers and power electronics such as electric power converters.

21 Claims, No Drawings

(56) References Cited

OTHER PUBLICATIONS

Qiu et al., "Preparation of Ni Nanoparticles and Evaluation of Their Tribological Performance as Potential Additives in Oils," copyright 2001, Journal of Tribology, vol. 123, pp. 441-443 (3 pages).
Zhou et al., "Tribological Behavior and Lubricating Mechanism of Cu Nanoparticles in Oil," copyright 2000, Tribology Letters, 8, pp. 213-218 (6 pages).

* cited by examiner

USE OF NANOPARTICLE COMPOSITIONS AS HEAT TRANSFER FLUIDS IN BATTERY OR OTHER ELECTRICAL EQUIPMENT SYSTEMS

CROSS REFERENCE TO RELATED APPLICATIONS

This application is a 35 U.S.C. § 371 U.S. national phase entry of International Application No. PCT/EP2020/069746 having an international filing date of Jul. 13, 2020, which claims the benefit of European Application No. 19186777.9 filed Jul. 17, 2019, each of which is incorporated herein by reference in its entirety.

FIELD

The invention relates to the use of a nanoparticle composition as a heat transfer fluid in battery systems or other electrical equipment. The electrical equipment can be in particular electric batteries, electric motors, electric vehicle transmissions, electric transformers, electric capacitors, fluid-filled transmission lines, fluid-filled power cables, computers and power electronics such as electric power converters.

BACKGROUND

In recent years, energy shortage and environmental concerns have had a tremendous impact on technological advancement. The increase of environmental awareness has led to a growing interest in so-called green technologies, especially in the automobile industry. The demand for emission-free vehicles fueled by renewable energy sources, such as pure electric vehicles (EVs), hybrid electric vehicles (HEVs) and fuel cell electric vehicles, has gradually become more significant and is anticipated to increase drastically in the next 20 years. The energy for such vehicles is provided and stored in batteries having a high specific energy density. Various batteries are available for EVs and HEVs, such as lead-acid, zinc/halogen, metal/air, sodium-beta, nickel metal hydride (Ni-MH) and lithium-ion (Li-ion).

To increase the performance of electric vehicles, large-scale batteries with a high current discharge are required. Due to the size and power output, these large-scale batteries generate a large amount of heat during rapid charge and discharge cycles at high current levels. Thus, batteries have to be thermally managed by cooling or dissipating heat to avoid battery malfunction and increase the lifetime of the battery.

Furthermore, the performance of the battery is temperature dependent. Depending on their type, batteries perform optimally only with a particular temperature range. Therefore, a proper thermal management allows optimizing battery performance.

There has been also a growing interest in the use of nanoparticles in lubricant formulations. Lubricants typically contain a base fluid and variable amounts of additives. Some additives in the lubricant formulation are used to reduce friction and wear between the contacts, which is important energy efficiency and durability of the device that is being lubricated. The nanoparticles are especially useful to achieve boundary lubrication and keep surfaces separated. Studies have shown that the addition of nanoparticles can drastically improve wear and friction performance (Zhou et al, *Tribology Letters* 8, 213-218 (2000); Qiu et al. *J. Tribol.* 123 (3), 441-443 (2001).

However, creating a stable dispersion of nanoparticles is problematic. Most untreated nanoparticles, such as hBN and metal disulfides, are hydrophilic in nature and therefore form poor dispersions in oil or non-polar environments. Furthermore, the poor dispersion and weak forces of the particles draw particles together causing agglomeration. These agglomerates will lead to sedimentation that is unwanted and ineffective for the formulation.

WO 2018/019783 A1 discloses the stabilization of oxide and oxidized metal nanoparticles by covalently bonding said nanoparticles with a polymer having alkyl (meth)acrylate monomer units. The document is silent on thermal management applications.

Naser Ali et al. *Review article* (2018): "A review on nanofluids: fabrication, stability and thermophysical properties" relates to the development of nanofluids and points that stability of nanofluids is a very important element in commercializing nanofluids as it extends the shelf-life of the product while conserving its thermo-physical properties. It also indicates that a major drawback of using such type of fluids is the rise in pressure losses in piping systems caused from the increase in viscosity of nanofluids. In this document, mainly hydrophilic heat transfer fluids are described as state of the art.

WO 2013/115925 A1 discloses a nanocomposite fluid including a fluid medium and a nanoparticle composition comprising nanoparticles, which are electrically insulating and thermally conductive. The document does not give any concrete examples regarding the preparation of the nanocomposite fluids. No details are given regarding the stability of the nanocomposite fluids, nor does it show any comparison of viscosity and thermal conductivity with the corresponding reference base fluid.

US 2004/069454 A1 discloses a composition for use in a heat transfer system, wherein the composition comprises metal nanoparticle powder dispersed in a heat transfer medium, wherein the nanoparticles are coated with a coating for imparting corrosion resistance and acting as a dispersant.

US 2015/048272 A1 also discloses a method for producing nanofluids with heat transfer capacity, wherein the heat transfer fluid may comprise water, ethylene glycol or mixture thereof and metal oxide such as alumina (see table 1 of US 2015/048272 A1).

WO2017/132122 A1 relates to heat transfer fluids for batteries comprising functionalized carbon nanoparticles and particles of one or more semi-crystalline polymers, which are dispersed in polar liquids. It is described that the disclosed compositions have the ability to absorb heat energy through the melting of the semi-crystalline polymer particles, while the addition of the carbon nanoparticles provide thermal conductivity to the disclosed compositions. Nothing is disclosed about the stabilization of particles in non-polar media.

The present invention aims at providing a new method for heat transfer in electrical equipment having moving parts such as electric motors and electric vehicle transmissions, or in electrical equipment without any moving parts such as electric batteries, electric transformers, electric capacitors, fluid-filled transmission lines, fluid-filled power cables, computers or power electronics such as electric power converters. In general, hydrophobic dielectric fluids are preferred if direct contact with metal parts is possible, which gives electrical insulation, because they prevent electrical contact due to safety reasons. Thus, it is an object of this invention to provide improved heat transfer nanofluids with increased stability of nanoparticles in hydrophobic media. The heat transfer nanofluid should be stable over time and fulfills the standards of applications, such as an improved heat transfer performance over a long period of time and at different temperatures, when used in an electrical device. In case the electrical equipment has moving parts, the heat transfer nanofluid should also have good tribological performance and stability under severe conditions (so called cooling lubricants).

SUMMARY

In the present invention, it was surprisingly found that a nanoparticle composition comprising nanoparticles and polymers can be used as a heat transfer fluid for batteries and other electrical equipment. The challenge was to combine great heat transfer performance, while maintaining the nanoparticles comprised in the heat transfer fluid well dispersed over a long period of time at high temperatures. The targeted use was achieved with the composition.

An additional advantage of using the nanoparticle compositions as heat transfer fluid in an electrical equipment having mechanical moving parts is that anti-friction performances are also obtained for the moving parts through the nanoparticles being very well dispersed in the lubrication oil.

According to a first aspect, the present invention consequently relates to the use of a nanoparticle composition as a heat transfer fluid. The nanoparticle compositions according to the invention are favorably used as a heat transfer fluid for electrical equipment such as electric batteries, electric motors, electric vehicle transmissions, electric transformers, electric capacitors, fluid-filled transmission lines, fluid-filled power cables, computers or power electronics such as electric power converters.

DETAILED DESCRIPTION

Thus, the present invention relates to the use of a nanoparticle composition as a heat transfer fluid in battery or other electrical equipment systems, wherein the nanoparticle composition is obtainable by milling a mixture, the mixture comprising one or more nanoparticle compound (A) and one or more polymer compound (B),
  (A) wherein the one or more nanoparticle compound is selected from the group consisting of
    metal or metalloid nitride nanoparticle;
    multi or single walled carbon nanotubes;
    carbon black;
    a metal chalcogenide having a molecular formula $MX_2$, wherein M is a metallic element selected from the group consisting of titanium (Ti), vanadium (V), manganese (Mn), iron (Fe), cobalt (Co), nickel (Ni), copper (Cu), zinc (Zn), zirconium (Zr), niobium (Nb), molybdenum (Mo), tantalum (Ta), tungsten (W), osmium (Os), and combinations thereof, and X is a chalcogen element selected from the group consisting of sulfur (S), oxygen (O) and combinations thereof;
    or a mixture thereof, and
  (B) wherein the one or more polymer compound is obtainable by polymerizing a monomer composition comprising:
    a) 1 to 30% by weight, based on the total weight of the monomer composition, of one or more functional monomer selected from the list consisting of:
      a1) aminoalkyl (meth)acrylates and aminoalkyl (meth)acrylamides like N-(3-dimethyl-aminopropyl)methacrylamide, 3-diethylaminopentyl (meth)acrylate, 3-dibutyl-aminohexadecyl (meth)acrylate;
    a2) nitriles of alkyl (meth)acrylic acid and other nitrogen-containing (meth)acrylates like N-(methacryloyloxyethyl)diisobutylketimine, N-(methacryloyloxyethyl)dihexadecyl-ketimine, (meth)acryloylamidoacetonitrile, 2-meth acryloyl oxy ethyl methyl cyanamide, cyanomethyl (meth)acrylate;
    a3) (meth)acrylates of ether alcohols like tetrahydrofurfuryl (meth)acrylate, methoxyethoxyethyl (meth)acrylate, 1-butoxypropyl (meth)acrylate, cyclohexyloxyethyl (meth)acrylate, propoxyethoxyethyl (meth)acrylate, benzyloxyethyl (meth)acrylate, furfuryl (meth)acrylate, 2-butoxyethyl (meth)acrylate, 2-ethoxy-2-ethoxyethyl (meth)acrylate, 2-methoxy-2-ethoxypropyl (meth)acrylate, ethoxylated (meth)acrylates, 1-ethoxybutyl (meth)acrylate, methoxyethyl (meth)acrylate, 2-ethoxy-2-ethoxy-2-ethoxyethyl (meth)acrylate, esters of (meth)acrylic acid and methoxy polyethylene glycols;
    a4) oxiranyl alkyl (meth)acrylate like 2,3-epoxybutyl (meth)acrylate, 3,4-epoxybutyl (meth)acrylate, 10,11 epoxyundecyl (meth)acrylate, 2,3-epoxycyclohexyl (meth)acrylate, oxiranyl (meth)acrylates such as 10,11-epoxyhexadecyl (meth)acrylate, glycidyl (meth)acrylate;
    a5) phosphorus-, boron- and/or silicon-containing alkyl (meth)acrylates like 2-(dimethyl-phosphato) propyl (meth)acrylate, 2-(ethylphosphito)propyl (meth)acrylate, 2 dimethylphosphinomethyl (meth)acrylate, dimethylphosphonoethyl (meth)acrylate, diethylmethacryloyl phosphonate, dipropylmethacryloyl phosphate, 2 (dibutylphosphono) ethyl (meth)acrylate, 2,3-butylenemethacryloylethyl borate, methyldiethoxymethacryloylethoxysilane, diethylphosphatoethyl (meth)acrylate;
    a6) heterocyclic alkyl (meth)acrylates like 2-(1-imidazolyl)ethyl (meth)acrylate, 2-(4-morpholinyl) ethyl (meth)acrylate, oxazolidinylethyl (meth)acrylate and N-methacryloylmorpholine;
    a7) vinyl halides like vinyl chloride, vinyl fluoride, vinylidene chloride and vinylidene fluoride;
    a8) vinyl esters like vinyl acetate;
    a9) vinyl monomers containing aromatic groups like styrene, substituted styrenes with an alkyl substituent in the side chain, such as alpha-methylstyrene and alpha-ethylstyrene, substituted styrenes with an alkyl substituent on the ring such as vinyltoluene and p-methylstyrene, halogenated styrenes such as monochlorostyrenes, dichlorostyrenes, tribromostyrenes and tetrabromostyrenes;
    a10) heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

a11) vinyl and isoprenyl ethers;
a12) methacrylic acid and acrylic acid,
b) 30 to 80% by weight of one or more alkyl (meth) acrylate monomer, wherein each of the alkyl group of the one or more alkyl (meth)acrylate monomer is independently linear, cyclic or branched and comprises from 1 to 40 carbon atoms, based on the total weight of the monomer composition, and
c) 20 to 60% by weight of the reaction product of one or more ester of (meth)acrylic acid and one or more hydroxylated hydrogenated polybutadiene having a number-average molecular weight ($M_n$) of 500 to 10,000 g/mol, based on the total weight of the monomer composition, and wherein the weight ratio of the one or more nanoparticle compound (A) to the one or more polymer compound (B) is 9:1 to 1:5.

According to a preferred embodiment, the weight ratio of the one or more nanoparticle compound (A) to the one or more polymer compound (B) is preferably 9:1 to 1:2, more preferably 5:1 to 1:2, most preferably 3:1 to 1:2.

According to another preferred embodiment, the amount of monomers a), b) and c) sum up to 100% by weight, based on the total weight of the monomer composition.

"One or more" as used herein means that at least one, or more than one, of the recited components maybe be used as disclosed.

"Other electrical equipment systems" as used herein means electrical equipment such as electric batteries, electric motors, electric vehicle transmissions, electric transformers, electric capacitors, fluid-filled transmission lines, fluid-filled power cables, computers or power electronics such as electric power converters.

The use defined above also means a method for enhancing the heat transfer and thermal conductivity in a heat transfer fluid used in battery or other electrical equipment systems, wherein the nanoparticle composition is obtainable by milling a mixture, the mixture comprising one or more nanoparticle compound (A) and one or more polymer compound (B) as defined above and throughout the description.

The heat transfer nanofluids according to the invention show increased stability of nanoparticles in hydrophobic media as demonstrated in the experimental part of the present document.

According to the present invention, it is preferred that the heat transfer fluid further comprises a base fluid (C), which has a kinematic viscosity at 40° C. from 3 cSt to 30 cSt, according to ASTM D-445 and a flash point higher than 110° C. according to ASTM D-93.

Advantageously it has been observed that the nanoparticle compositions used as a heat transfer fluid in battery or other electrical equipment systems having metal moving parts do not only enhance heat transfer and thermal conductivity, but also provide good tribological properties. Table 11 in the experimental part illustrates this additional beneficial friction reduction performance which can be directly translated into energy efficiency in automotive and industrial applications.

Nanoparticles (A)

According to the present invention, the nanoparticle compound (also referred to as "particle" or "nanoparticle" in the present text) is a microscopic particle with at least one dimension being between 1 and 500 nm, preferably between 10 and 300 nm and more preferably between 30 and 200 nm (determined using transmission electron microscopy, TEM). This particle can either be of individual character or be present in an aggregated and/or agglomerated structure. In the latter, the size of the primary particle is between the aforementioned sizes in at least one dimension. The size of the aggregated/agglomerated structure can be between 50 and 150,000 nm, preferably between 100 and 100,000 nm and more preferably between 400 to 70,000 nm (determined using static light scattering technique, d50 SLS).

In the present invention, the SLS (Static Light Scattering) measurement is performed using a Beckmann Coulter LS 13 320 equipment. 0.1 to 2 wt % of the corresponding powder is given into a 0.05 wt % sodium pyrophosphate solution in water and homogenized for one minute using ultrasound 0.2 to 2 g of this solution is given into the measuring device, which is filled with approximately 200 mL water. The mathematic calculation of d50 is performed on volume-basis and using the Fraunhofer optical model.

All above-indicated dimensions are provided for illustrative purposes only and are not intended to limit the present disclosure.

According to a preferred aspect of the present invention, the nanoparticle is selected from nitrides of boron or aluminum or a mixture thereof, more preferably hBN.

According to another preferred aspect of the present invention, the nanoparticle is carbon black.

According to another preferred aspect of the present invention, the nanoparticle (A) is a metal chalcogenide having a molecular formula $MX_2$, where M is a metallic element selected from the group consisting of titanium (Ti), vanadium (V), manganese (Mn), iron (Fe), cobalt (Co), nickel (Ni), copper (Cu), zinc (Zn), zirconium (Zr), niobium (Nb), molybdenum (Mo), tantalum (Ta), tungsten (W), osmium (Os), and combinations thereof, and X is a chalcogen element selected from the group consisting of sulfur (S) and/or oxygen (O); and combinations thereof. Preferably, the metal chalcogenide has a molecular formula $MX_2$ wherein the metallic element M is tungsten (W) or molybdenum (Mo) and the chalcogen element X is sulfur (S).

The $MX_2$ compound according to this invention can be an intercalation compound, meaning a compound that can be inserted between elements or layers. The intercalation compound typically has a fullerene-like geometry. The core of the fullerene-like geometry may be hollow, solid, amorphous, or a combination thereof. A fullerene-like geometry may also be referred to as having a cage geometry. More specifically, in some embodiments, an intercalation compound having an inorganic fullerene-like geometry may be a cage geometry that is hollow or solid at its core and layered at its periphery. For example, the intercalation compound having the inorganic fullerene like geometry may be a single layer or double layered structure. The intercalation compound is not limited on only single layer or double layered structures, as the intercalation compound may have any number of layers. These structures are also referred to in the art as being nested layer structures. Preferably the intercalation compound is selected from $WS_2$ or $MoS_2$ or a mixture thereof, more preferably $WS_2$.

In a preferred embodiment, the inorganic fullerene-like geometry of the intercalation compound may be of spherical, near spherical, polyhedral, elongated, rod-, cube-, sheet- or tube-like geometry or a mixture thereof, with or without a hollow core.

According to a preferred aspect of the present invention, the nanoparticle is selected from mixture of above-mentioned structures, more preferably is selected from hexagonal boron nitride (hBN) nanoparticle; carbon black; a metal chalcogenide having a molecular formula $MX_2$ wherein the metallic element M is tungsten (W) or molybdenum (Mo) and the chalcogen element X is sulfur (S); or a mixture thereof.

Polymer (B)

The polymer of the invention is not a crystalline or semi-crystalline polymer but is an amorphous polymer.

In a preferred embodiment of the invention, the one or more polymer compound (B) has a weight-average molecular weight ($M_w$) of 10,000 to 1,000,000 g/mol, more preferably 50,000 to 800,000 g/mol, even more preferably 100,000 to 500,000 g/mol, most preferably 150,000 to 350,000 g/mol.

In the present invention, the weight-average molecular weights ($M_w$) of the polymers (B) were determined by gel permeation chromatography (GPC) using polymethylmethacrylate (PMMA) calibration standards and tetrahydrofuran (THF) as eluent (flow rate: 1 mL/min; injected volume: 100 μL).

Preferably, the one or more polymer compound (B) prepared with a monomer composition comprising the monomer components a), b) and c) is obtainable by polymerizing a monomer composition comprising:
  a) 5 to 30% by weight, more preferably 10 to 20% by weight of the one or more functional monomer as component a), based on the total weight of the monomer composition; and
  b) 35 to 70% by weight, more preferably 40 to 60% by weight of the one or more alkyl (meth)acrylate monomer wherein each of the alkyl group of the one or more alkyl (meth)acrylate monomer independently is linear, cyclic or branched and comprises from 1 to 40 carbon atoms, based on the total weight of the monomer composition; and
  c) 25 to 55% by weight, more preferably 30 to 50% by weight of one or more ester of (meth)acrylic acid and one or more hydroxylated hydrogenated polybutadiene having a number-average molecular weight ($M_n$) of 500 g/mol to 10,000 g/mol, based on the total weight of the monomer composition.

In a preferred embodiment, the weight contents of monomers a), b) and c) of the monomer composition sum up to 100% by weight, based on the total weight of the monomer composition.

Functional Monomer a)

As already defined above, the one or more functional monomer a) according to the present invention are selected from the list consisting of:
  a1) aminoalkyl (meth)acrylates and aminoalkyl (meth)acrylamides;
  a2) nitriles of alkyl (meth)acrylic acid and other nitrogen-containing alkyl (meth)acrylates;
  a3) (meth)acrylates of ether alcohols;
  a4) oxiranyl alkyl (meth)acrylate;
  a5) phosphorus-, boron- and/or silicon-containing alkyl (meth)acrylates;
  a6) heterocyclic alkyl (meth)acrylates;
  a7) vinyl halides;
  a8) vinyl esters;
  a9) vinyl monomers containing aromatic groups;
  a10) heterocyclic vinyl compounds;
  a11) vinyl and isoprenyl ethers;
  a12) methacrylic acid and acrylic acid.

Preferably, the functional monomer a) is selected from an aminoalkyl (meth)acrylate a1) or an aminoalkyl (meth)acrylamide a1) or a heterocyclic alkyl (meth)acrylate a6) or a vinyl monomer containing aromatic groups a9). More preferably, from an aminoalkyl (meth)acrylamide a1) or a vinyl monomer containing aromatic groups a9) or a mixture thereof.

Even more preferably, the functional monomer a) is selected from aminoalkyl (meth)acrylamide, most preferably N-(3-dimethyl-aminopropyl)methacrylamide, as first component a), and a vinyl monomer containing aromatic groups, most preferably styrene, as second component a).

Alkyl (Meth)Acrylate Monomer b)

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

The term "$C_{1-40}$ alkyl (meth)acrylates" refers to esters of (meth)acrylic acid and straight chain, cyclic or branched alcohols having 1 to 40 carbon atoms. The term encompasses individual (meth)acrylic esters with an alcohol of a particular length, and likewise mixtures of (meth)acrylic esters with alcohols of different lengths.

According to the invention it is preferred that in optional component b) of the nanoparticle composition each of the alkyl group of the one or more alkyl (meth)acrylate monomer independently is linear, cyclic or branched and comprises from 1 to 40 carbon atoms.

As already indicated above, according to the invention, the one or more alkyl (meth)acrylate monomer b) comprises
  b1) one or more alkyl (meth)acrylate of formula (I):

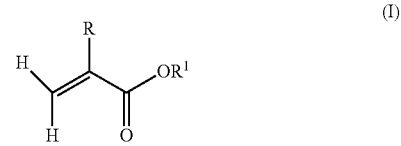

wherein R is hydrogen or methyl, $R^1$ means a linear, branched or cyclic alkyl residue with 1 to 8 carbon atoms, preferably 1 to 5 carbon atoms, and more preferably 1 to 4 carbon atoms, b2) one or more alkyl (meth)acrylate of formula (II):

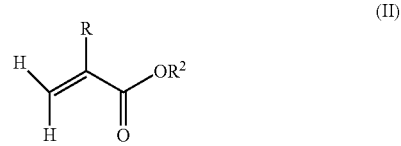

wherein R is hydrogen or methyl, $R^2$ means a linear, branched or cyclic alkyl residue with 9 to 15 carbon atoms, preferably 12 to 15 carbon atoms, and more preferably 12 to 14 carbon atoms, b3) one or more alkyl (meth)acrylate of formula (III):

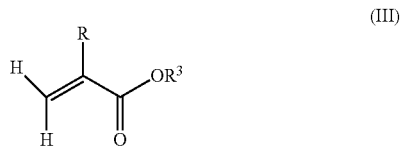

wherein R is hydrogen or methyl, $R^3$ means a linear, branched or cyclic alkyl residue with 16 to 40 carbon atoms, preferably 16 to 30 carbon atoms, and more preferably 16 to 22 carbon atoms.

The term "$C_{1-8}$ alkyl (meth)acrylates" refers to esters of (meth)acrylic acid and straight chain or branched alcohols having 1 to 8 carbon atoms. The term encompasses individual (meth)acrylic esters with an alcohol of a particular length, and likewise mixtures of (meth)acrylic esters with alcohols of different lengths.

According to the invention each of the one or more monomer according to formula (I), i.e. the $C_{1-8}$ alkyl (meth) acrylates, may independently be selected from the group consisting of (meth)acrylates derived from saturated alcohols, preferably methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate, hexyl (meth)acrylate, cycloalkyl (meth)acrylates, cyclopentyl (meth)acrylate, cyclohexyl (meth)acrylate, 2-ethylhexyl (meth)acrylate, heptyl (meth)acrylate, 2-tert-butylheptyl (meth)acrylate, n-octyl (meth)acrylate and 3-isopropylheptyl (meth)acrylate, the most preferred monomer according to formula (II) is methyl methacrylate.

Particularly preferred $C_{1-8}$ alkyl (meth)acrylates are methyl (meth)acrylate and n-butyl (meth)acrylate; methyl methacrylate and n-butyl methacrylate are especially preferred.

The term "$C_{9-15}$ alkyl (meth)acrylates" refers to esters of (meth)acrylic acid and straight chain or branched alcohols having 9 to 15 carbon atoms. The term encompasses individual (meth)acrylic esters with an alcohol of a particular length, and likewise mixtures of (meth)acrylic esters with alcohols of different lengths.

According to the invention each of the one or more monomer according to formula (II), i.e. the $C_{9-15}$ alkyl (meth)acrylates, may also independently be selected from the group consisting of nonyl (meth)acrylate, decyl (meth) acrylate, isodecyl (meth)acrylate, undecyl (meth)acrylate, 5-methylundecyl (meth)acrylate, n-dodecyl (meth)acrylate, 2-methyldodecyl (meth)acrylate, tridecyl (meth)acrylate, 5-methyltridecyl (meth)acrylate, n-tetradecyl (meth)acrylate, pentadecyl (meth)acrylate, oleyl (meth)acrylate, cycloalkyl (meth)acrylates, cyclohexyl (meth)acrylate having a ring substituent, tert-butylcyclohexyl (meth)acrylate, trimethylcyclohexyl (meth)acrylate, bornyl (meth)acrylate and isobornyl (meth)acrylate.

Particularly preferred $C_{9-15}$ alkyl (meth)acrylates are (meth)acrylic esters of a linear $C_{12-14}$ alcohol mixture ($C_{12-14}$ alkyl (meth)acrylate).

The term "$C_{16-40}$ alkyl (meth)acrylates" refers to esters of (meth)acrylic acid and straight chain or branched alcohols having 16 to 40 carbon atoms. The term encompasses individual (meth)acrylic esters with an alcohol of a particular length, and likewise mixtures of (meth)acrylic esters with alcohols of different lengths.

According to the invention each of the one or more monomer according to formula (III), i.e. the $C_{16-40}$ alkyl (meth)acrylates, may also independently be selected from the group consisting of hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate, behenyl (meth)acrylate, eicosyltetratriacontyl (meth)acrylate, cycloalkyl (meth)acrylates, 2,4,5-tri-t-butyl-3-vinylcyclohexyl (meth)acrylate, and 2,3,4,5-tetra-t-butylcyclohexyl (meth)acrylate.

Preferably, the $C_{1-40}$ alkyl (meth)acrylates include a mixture of $C_{1-8}$ alkyl (meth)acrylates and $C_{9-15}$ alkyl (meth) acrylates, more preferably a mixture of $C_{1-4}$ alkyl (meth) acrylates and $C_{12-15}$ alkyl (meth)acrylates.

Macromonomer Component (c)

According to the invention, the above-defined monomer composition comprises as component c) one or more ester of (meth)acrylic acid and one or more hydroxylated hydrogenated polybutadiene having a number-average molecular weight ($M_n$) of 500 to 10,000 g/mol. In this context, the polymer compound (B) of this invention comprises a first polymer, which is also referred to as backbone or main chain, and a multitude of further polymers which are referred to as side chains and are bonded covalently to the backbone. In the present case, the backbone of the polymer is formed by the interlinked unsaturated groups of the mentioned (meth)acrylic acid esters. The alkyl groups and the hydrogenated polybutadiene chains of the (meth)acrylic esters form the side chains of the polymer. The reaction product of one or more additional ester of (meth)acrylic acid and one or more hydroxylated hydrogenated polybutadiene having a number-average molecular weight of 500 to 10,000 g/mol is also referred in the present invention as macromonomer.

The number-average molecular weight $M_n$ of the macromonomer is determined by gel permeation chromatography (GPC) using polybutadiene calibration standards according to DIN 55672-1 with tetrahydrofuran (THF) as eluent.

The one or more polymer compound (B) prepared with a monomer composition comprising the components a), b) and c) can be characterized on the basis of its molar degree of branching ("f-branch"). The molar degree of branching refers to the percentage in mol % of macromonomers (component (c)) used, based on the total molar amount of all the monomers in the monomer composition. The molar amount of the macromonomers used is calculated on the basis of the number-average molecular weight ($M_n$) of the macromonomers. The calculation of the molar degree of branching is described in detail in WO 2007/003238 A1, especially on pages 13 and 14, to which reference is made here explicitly.

Preferably, the one or more polymer compound (B) has a molar degree of branching $f_{branch}$ of 0.1 to 6 mol %, more preferably 1 to 4 mol % and most preferably 1.5 to 3 mol %.

By combining a macromonomer as component c) based on a macroalcohol having number-average molecular weight ($M_n$) of 500 g/mol to 10,000 g/mol with the one or more functional monomer a) and the one or more alkyl (meth) acrylate monomer b) according to the invention, a polymer (B) can be obtained which when combined with the nanoparticle compound (A) offers a stable well-dispersed nanoparticle composition.

The one or more hydroxylated hydrogenated polybutadienes for use as component c) in accordance with the invention have a number-average molecular weight ($M_n$) of 500 g/mol to 10,000 g/mol. Because of their high molecular mass, the hydroxylated hydrogenated polybutadienes can also be referred to as macroalcohols in the context of this invention. The corresponding esters of (meth)acrylic acid can also be referred to as macromonomers in the context of this invention.

Component c) may comprise a single type of macromonomer or may comprise a mixture of different macromonomers based on different macroalcohols.

The hydroxylated hydrogenated polybutadiene may be a single polybutadiene with a single number-average molecular weight ($M_n$) or it may be a mixture of different polybutadienes having different number-average molecular weight ($M_n$).

Preferably, the monomer composition comprises as component c) 20 to 80% by weight, more preferably 20 to 70% by weight, even more preferably 20 to 60% by weight, most preferably 20 to 50% by weight, of one or more ester of (meth)acrylic acid and one or more hydroxylated hydrogenated polybutadiene having a number-average molecular weight ($M_n$) of 500 g/mol to 10,000 g/mol, based on the total weight of the monomer composition.

In a preferred embodiment the one or more hydroxylated hydrogenated polybutadienes for use as component c) in accordance with the invention have a number-average molecular weight ($M_n$) of 1,500 to 7,500 g/mol.

Preferably, the one or more hydroxylated hydrogenated polybutadiene of component c) has a number-average molecular weight ($M_n$) of 1,500 to 2,100 g/mol, more preferably 1,800 to 2,100 g/mol, most preferably 1,900 to 2,100 g/mol.

In another preferred embodiment, component c) may be one macromonomer prepared using one or more macroalcohols having different molecular weights, the first macroalcohol having a number-average molecular weight of 1,500 to 2,100 g/mol, more preferably 1,800 to 2,100 g/mol, most preferably 1,900 to 2,100 g/mol, and the second macroalcohol having a number-average molecular weight of 3,500 to 7,000 g/mol, preferably 4,000 to 6,000 g/mol, more preferably 4,500 to 5,000 g/mol. Component c) may also comprise a mixture of two macromonomers, the first macromonomer being prepared with a macroalcohol having a number-average molecular weight of 1,500 to 2,100 g/mol, more preferably 1,800 to 2,100 g/mol, most preferably 1,900 to 2,100 g/mol, and the second macromonomer being prepared with a macroalcohol having a number-average molecular weight of 3,500 to 7,000 g/mol, preferably 4,000 to 6,000 g/mol, more preferably 4,500 to 5,000 g/mol.

According to a preferred embodiment of the present invention, by combining two macromonomers of different number-average molecular weights, the weight proportion of the lower molecular weight macromonomer to the higher molecular weight macromonomer is preferably one or more, more preferably 1.5 to 15, even more preferably 2 to 7, most preferably 3 to 6.

In a preferred embodiment, the hydroxylated hydrogenated polybutadiene is a monohydroxylated hydrogenated polybutadiene, preferably a hydroxyethyl-terminated or hydroxypropyl-terminated hydrogenated polybutadiene.

In another preferred embodiment of the invention, the one or more ester of (meth)acrylic acid of the component c) used for the preparation of the polymer compound (B) is methyl (meth)acrylate or ethyl (meth)acrylate.

Preferably, the one or more hydroxylated hydrogenated polybutadiene has a hydrogenation level of at least 99%. An alternative measure of the hydrogenation level which can be determined on the polymer of the invention is the iodine number. The iodine number refers to the number of grams of iodine which can be added onto 100 g of polymer. Preferably, the polymer of the invention has an iodine number of not more than 5 g of iodine per 100 g of polymer. The iodine number is determined by the Wijs method according to DIN 53241-1:1995-05.

Preferred hydroxylated hydrogenated polybutadienes can be obtained according to GB 2270317.

As used herein, the term "hydroxylated hydrogenated polybutadiene" refers to a hydrogenated polybutadiene that comprises one or more hydroxyl group. The hydroxylated hydrogenated polybutadiene may further comprise additional structural units, such as polyether groups derived from the addition of alkylene oxides to a polybutadiene or a maleic anhydride group derived from the addition of maleic anhydride to a polybutadiene. These additional structural units may be introduced into the polybutadiene when the polybutadiene is functionalized with hydroxyl groups.

Preference is given to monohydroxylated hydrogenated polybutadienes. More preferably, the hydroxylated hydrogenated polybutadiene is a hydroxyethyl- or hydroxypropyl-terminated hydrogenated polybutadiene. A preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with an alkylene oxide, such as ethylene oxide or propylene oxide, a hydroxy-functionalized polybutadiene can be prepared. The polybutadiene may also be reacted with more than one alkylene oxide units, resulting in a polyether-polybutadiene block copolymer having a terminal hydroxyl group. The hydroxylated polybutadiene can be hydrogenated in the presence of a suitable transition metal catalyst.

These monohydroxylated hydrogenated polybutadienes can also be selected from products obtained by hydroboration of (co)polymers of having a terminal double bond (e.g. as described in U.S. Pat. No. 4,316,973); maleic anhydride-ene-amino alcohol adducts obtained by an ene reaction between a (co)polymer having a terminal double bond and maleic anhydride with an amino alcohol; and products obtained by hydroformylation of a (co)polymer having a terminal double bond, followed by hydrogenation (e.g. as described in JP Publication No. S63-175096).

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate ($Ti(OiPr)_4$) or dioctyltin oxide ($Sn(OCt)_2O$). The reaction is an equilibrium reaction. Therefore, the low molecular weight alcohol released is typically removed, for example by distillation.

In addition, the macromonomers can be obtained by a direct esterification proceeding, for example, from (meth)acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

Preferable Monomer Compositions

According to a preferred aspect of the invention, the one or more polymer compound (B) is obtainable by polymerizing a monomer composition comprising:
- a) 1 to 30% by weight, preferably 5 to 30% by weight, more preferably 10 to 20% by weight, of the one or more functional monomer, as component a), based on the total weight of the monomer composition; and
- b1) 30 to 60% by weight, preferably 30 to 50% by weight, more preferably 35 to 50% by weight, of the one or more alkyl (meth)acrylate monomer of formula (I), as first component b), based on the total weight of the monomer composition; and
- b2) 0 to 20% by weight, preferably 1 to 15% by weight, more preferably 1 to 10% by weight, of the one or more alkyl (meth)acrylate monomer of formula (II), as second component b), based on the total weight of the monomer composition; and,
- b3) 0 to 20% by weight, preferably 0 to 15% by weight, more preferably 0 to 10% by weight, of the one or more alkyl (meth)acrylate monomer of formula (III), as third component b), based on the total weight of the monomer composition; and,
- c) 20 to 60% by weight, more preferably 25 to 55% by weight, more preferably 30 to 50% by weight of the reaction product of one or more ester of (meth)acrylic acid and one or more hydroxylated hydrogenated polybutadiene having a number-average molecular weight ($M_n$) of 500 to 10,000 g/mol, based on the total weight of the monomer composition;

wherein the amounts of all monomers of the monomer composition sum up to 100% by weight.

In a particularly preferred embodiment of the invention the one or more polymer compound (B) is obtainable by polymerizing a monomer composition comprising:
- a1) 0.5 to 5% by weight of an aminoalkyl (meth)acrylamide, most preferably N-(3-dimethyl-aminopropyl) methacrylamide, as first component a), based on the total weight of the monomer composition; and
- a9) 5 to 15% by weight of a vinyl monomer containing aromatic groups, most preferably styrene, as second component a), based on the total weight of the monomer composition; and
- b1) 35 to 50% by weight of an alkyl (meth)acrylate monomer of formula (I), most preferably methyl methacrylate and/or butyl methacrylate, as first component b), based on the total weight of the monomer composition; and
- b2) 1 to 10% by weight of an alkyl (meth)acrylate monomer of formula (II), most preferably lauryl methacrylate, as second component b), based on the total weight of the monomer composition; and
- c) 30 to 50% by weight of an ester of a (meth)acrylic acid and a hydroxylated hydrogenated polybutadiene having a number-average molecular weight ($M_n$) of 500 to 10,000 g/mol, most preferably a macromonomer derived from the reaction of an ester of a (meth)acrylic acid and a hydroxylated hydrogenated polybutadiene having a number-average molecular weight ($M_n$) of 1,500-5,000 g/mol, as component c), based on the total weight of the monomer composition;

wherein the amount of all monomers of the monomer composition sum up to 100% by weight.

Preparation of the Polymer Compound (B)

According to the present invention, the above-mentioned polymers may be prepared following the method comprising the steps of:
- (x) providing a monomer composition as described above; and
- (y) initiating radical polymerization in the monomer composition.

Standard free-radical polymerization is detailed, inter alia, in Ullmann's Encyclopedia of Industrial Chemistry, Sixth Edition. In general, a polymerization initiator and optionally a chain transfer agent are used for this purpose.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polymerization step (y) may be performed with or without dilution in oil. If dilution is performed, then the amount of the monomer composition, i.e. the total amount of monomers, relative to the total weight of the reaction mixture is preferably 20 to 90% by weight, more preferably 40 to 80% by weight, most preferably 50 to 70% by weight.

Preferably, the oil used for diluting the monomer mixture is an API Group I, II, III, IV or V oil, or a mixture thereof. Preferably, a Group III oil or a mixture thereof is used to dilute the monomer mixture.

Preferably, step (y) comprises the addition of a radical initiator.

Suitable radical initiators are, for example, azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

Preferably, the radical initiator is selected from the group consisting of 2,2'-azobis(2-methylbutyronitrile), 2,2-bis(tert-butylperoxy)butane, tert-butylperoxy 2-ethylhexanoate, 1,1-di-tert-butylperoxy-3,3,5-trimethylcyclohexan, tert-butyl peroxybenzoate and tert-butylperoxy-3,5,5-trimethylhexanoat. Particularly preferred initiators are tert-butylperoxy 2-ethylhexanoate and 2,2-bis(tert-butylperoxy) butane.

Preferably, the total amount of radical initiator relative to the total weight of the monomer mixture is 0.01 to 5% by weight, more preferably 0.02 to 0.8% by weight.

The total amount of radical initiator may be added in a single step or the radical initiator may be added in several steps over the course of the polymerization reaction. Preferably, the radical initiator is added in several steps. For example, a part of the radical initiator may be added to initiate radical polymerization and a second part of the radical initiator may be added 0.5 to 3.5 hours after the initial dosage.

Preferably, step (y) also comprises the addition of a chain transfer agent. Suitable chain transfer agents are especially oil-soluble mercaptans, for example n-dodecyl mercaptan or 2-mercaptoethanol, or else chain transfer agents from the class of the terpenes, for example terpinolene. Particularly preferred is the addition of n-dodecyl mercaptan.

It is also possible to divide the monomer composition into an initial part and a second part and to add a part of the radical initiator to the initial part only to start the polymerization reaction therein. Then, the second part of the radical initiator is added to the second part of the monomer composition which is then added over the course of 0.5 to 5 hours, preferably 1.5 to 4 hours, more preferably 2 to 3.5 hours, to the polymerization reaction mixture. After addition of the second monomer mixture, a third part of the radical initiator may be added to the polymerization reaction as described above.

Preferably, the total reaction time of the radical polymerization is 2 to 10 hours, more preferably 3 to 9 hours.

After completion of the radical polymerization, the obtained polymer is preferably further diluted with the above-mentioned oil to the desired viscosity. Preferably, the polymer is diluted to a concentration of 5 to 60% by weight polymer, more preferably 10 to 50% by weight, most preferably 20 to 40% by weight.

The Nanoparticle Composition of the Invention

According to a preferred embodiment of the invention, the nanoparticle composition comprising the one or more nanoparticle (A) and the one or more polymer compound (B) as defined herein may further comprises a base fluid (C).

In a preferred embodiment, the base fluid (C) has a kinematic viscosity at 40° C. from 3 cSt to 30 cSt, more preferably from 3 cSt to 15 cSt, according to ASTM D-445 and a flash point higher than 110° C. according to ASTM D-93.

The base fluid (C) can be a base oil, selected from the list consisting of an API Group I base oil, an API Group II base oil, an API Group III, an API Group IV base oil and an API Group V base oil or a combination thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. The table below illustrates these API classifications.

TABLE 1

API definition of lubricant base stocks

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

In a preferred embodiment, the base fluid (C) with a kinematic viscosity at 40° C. from 3 cSt to 30 cSt, more preferably from 3 cSt to 15 cSt, according to ASTM D-445 and a flash point higher than 110° C. according to ASTM D-93 is selected from polyalphaolefin, tetrabutane, API Group III base oil or a mixture thereof; preferably, tetrabutane or API Group III base oil, or a mixture thereof.

The base fluid (C) can be a fluorinated compound, such as polyhexafluoropropylene oxide, perfluroropolyether (PFPE), perfluoroalkylether (PFAE), perfluoroppolyalkylether (PFPAE), a hydrofluorether, or a mixture thereof.

If the base fluid (C) is selected from API group V base oil, it is preferably selected from the group consisting of a silicone oils, naphthenes, polyalkylene glycols, synthetic oils including liquid esters of phosphorus containing acids, or a mixture thereof.

The base fluid (C) can also be a mixture of any base oils listed above.

It is preferred that the nanoparticle composition for use as a heat transfer fluid comprises 85 to 99.9% by weight of a base fluid (C) and 0.1 to 15% by weight of (A) and (B), more preferably 90 to 99.9% by weight of a base fluid (C) and 0.1 to 10% by weight of (A) and (B), most preferably 92 to 99.5% by weight of a base fluid (C) and 0.5 to 8% by weight of (A) and (B), based on the total weight of the nanoparticle composition. Preferably, the amounts of (A), (B) and (C) sum up to 100% by weight, based on the total weight of the nanoparticle composition.

In a preferred embodiment of the method for manufacturing the nanoparticle composition, the mixture of one or more nanoparticle (A), the one or more polymer compound (B) and optionally the base fluid (C) is milled using an ultrasound equipment having between 10 to 1000 W, preferably 50 to 800 W and more preferably 100 to 500 W power. Preferably, the composition is milled for 1 to 240 minutes, more preferably for 10 to 180 minutes and even more preferably for 30 to 150 minutes to achieve a stable nanoparticle composition.

In another preferred embodiment, the mixture of one or more nanoparticle (A), the one or more polymer compound (B) and optionally the base fluid (C) is milled using ultra-high-pressure technology (e.g. jet mill equipment Sugino Ultimaizer HJP-25050). At least two flows of this mixture are sprayed by means of pumps, preferably high-pressure pumps, through one nozzle (0.25 mm diameter) each into a grinding chamber enclosed by a reactor housing onto a collision point, characterized in that the grinding chamber is flooded with the mixture and the finally milled mixture is removed from the grinding chamber by the overpressure of the continuous flow into the grinding chamber. The pump pressure is between 100 to 4000 bar, preferably between 400 to 3000 bar, more preferably between 1000 to 2500 bar.

According to another preferred embodiment, the nanoparticle composition comprising one or more nanoparticle (A), one or more polymer compound (B) and optionally the base fluid (C) is milled via a ball mill process. Preferably, the ball mill process comprises introducing 0.1 to 10 kWh/kg, preferably 1 to 5 kWh/kg, more preferably 1.5 to 3.5 kWh/kg energy into the mixture.

In another preferred embodiment, the method for manufacturing a nanoparticle composition, especially a nanoparticle composition as described above comprises the steps of:
(i) providing one or more nanoparticle compound (A) as defined herein;
(ii) providing one or more polymer compound (B) as defined herein;
(iii) preferably, providing a base fluid (C) as defined herein;
(iv) combining at least the one or more nanoparticle compound (A) and the one or more polymer compound (B) to obtain a mixture, preferably combining at least the one or more nanoparticle compound (A), the one or more polymer compound (B) and the base fluid (C) to obtain a mixture; and
(v) milling the mixture.

According to this invention, the milling step (v) is defined by a resulting change of particle size distribution of the nanoparticle composition measured using dynamic light scattering technology (DLS).

The milling technology according to the invention described in step (v) can be dissolver, rotor-stator equipment, homogenization, high pressure homogenization, high shear mixing, ultrasonic sound, ball milling or ultrahigh-pressure technology (jet mill) or a combination thereof. Indeed, the particle size of the agglomerates is reduced using these milling technologies.

The most preferred embodiment is milling the mixture via a ball mill process.

The nanoparticle composition used as a heat transfer fluid according to the invention may optionally further contain, as component (D), further additives selected from the group consisting of dispersants, defoaming agents, seal fix or seal compatibility agents, detergents, antioxidants, pour point depressants, antiwear additives, extreme pressure additives, corrosion inhibitors, metal passivators, rust inhibitors, electrostatic discharge depressants, demulsifiers, emulsifiers, friction modifiers, dyes and mixtures thereof, as discussed below.

Appropriate dispersants include poly(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 10% by weight, based on the total amount of the nanoparticle composition.

Suitable defoamers are silicone oils, fluorosilicone oils, fluoroalkyl ethers.

The defoaming agent is preferably used in an amount of 0.005 to 0.5% by weight, based on the total amount of the nanoparticle composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 5% by weight, based on the total amount of the nanoparticle composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyi-4-(N,N'-dimethylaminomethylphenol); 4,4' thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate]. Of those, especially preferred are bis-phenol-based antioxidants and ester group containing phenol-based antioxidants.

The amine-based antioxidants include, for example, monoalkyldiphenylamines such as monooctyldiphenylamine, monononyldiphenylamine; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine; polyalkyldiphenylamines such as tetrabutyldiphenylamine, tetrahexyldiphenylamine, tetraoctyldiphenylamine, tetranonyldiphenylamine; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.2 to 5% by weight, based on the total amount of the nanoparticle composition.

The pour-point depressants include ethylene-vinyl acetate copolymers, chlorinated paraffin-naphthalene condensates, chlorinated paraffin-phenol condensates, polymethacrylates, polyalkylstyrenes. Preferred are polymethacrylates having a weight-average molecular weight ($M_w$) of from 5,000 to 200,000 g/mol.

The amount of the pour point depressant is preferably from 0.1 to 5% by weight, based on the total amount of the nanoparticle composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds; sulfur and phosphorus-containing anti-wear agents such as thiophosphites, thiophosphates, thiophosphonates, amine salts or metal salts of those compounds.

The antiwear agent may be present in an amount of 0 to 3% by weight, preferably 0.1 to 2% by weight, based on the total amount of the nanoparticle composition.

The preferred friction modifiers may include mechanically active compounds, for example molybdenum disulphide, graphite (including fluorinated graphite), poly (trifluorethylene), polyamide, polyimide; compounds which form adsorption layers, for example long-chain carboxylic acids, fatty acid esters, ethers, alcohols, amines, amides, imides; compounds which form layers through tribochemical reactions, for example saturated fatty acids, phosphoric acid esters; compounds which form polymer-like layers, for example ethoxylated dicarboxylic acid partial esters, functionalized poly(meth)acrylates, unsaturated fatty acids, sulphurized olefins and organometallic compounds, for example molybdenum compounds (molybdenum dithiophosphates and molybdenum dithiocarbamates MoDTC) and their combinations with ZnDTPs, copper-containing organic compounds.

Some of the compounds listed above may fulfil multiple functions. ZnDTP, for example, is primarily an antiwear additive and an extreme pressure additive, but also has the character of an antioxidant and a corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additive (D) is up to 20% by weight, more preferably 0.05% to 15% by weight, based on the total weight of the nanoparticle composition.

Preferably, the amounts of (A) to (D) add up to 100% by weight, based on the total weight of the nanoparticle composition.

Experimental Part

The invention is further illustrated in detail hereinafter with reference to examples and comparative examples, without any intention to limit the scope of the present invention.

Abbreviations $C_1$ AMA $C_1$-alkyl methacrylate (methyl methacrylate; MMA)
$C_4$ AMA $C_4$-alkyl methacrylate (n-butyl methacrylate)
$C_{12-14}$ AMA $C_{12-14}$-alkyl methacrylate
DMAPMA N-3-Dimethylaminopropylmethacrylamid
$f_{branch}$ degree of branching in mol %
CTA chain transfer agent
MMA methyl(meth)acrylate
MA-1 macroalcohol (hydroxylated hydrogenated polybutadiene Mn=2,000 g/mol)
MM-1 macromonomer of hydrogenated polybutadiene MA-1 with methacrylate functionality ($M_n$=2,000 g/mol)
$M_n$ number-average molecular weight
$M_w$ weight-average molecular weight
NB3020 Nexbase® 3020, Group III base oil from Neste with a $KV_{40}$ of 7.7 cSt (ASTM D-445) and a flash point of >150° C. (ASTM D-93)
NB3043 Nexbase® 3043, Group III base oil from Neste with a $KV_{40}$ of 20 cSt (ASTM D-445) and a flash point of >220° C. (ASTM D-92)
Tetrabutane tetrabutane (branched $C_{16}$ and $C_{20}$ saturated hydrocarbon isomers) with a $KV_{40}$ of 4.2 cSt (ASTM D-445) and a flash point of 124° C. (ASTM D-93)
PDI polydispersity index, molecular weight distribution calculated via $M_w/M_n$
IF-$WS_2$ inorganic-fullerene tungsten disulphide
hBN hexagonal boron nitride Synthesis of a Hydroxylated Hydrogenated Polybutadiene (Macroalcohol) MA-1

The macroalcohol was synthesized by anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and 200 bar pressure. After the hydrogenation had ended, the noble metal catalyst was removed and organic solvent was drawn off under reduced pressure to obtain a 100% macroalcohol MA-1.

Table 2 summarizes the characterization data of MA-1

TABLE 2

Characterization data of used macroalcohol.

| | $M_n$ [g/mol] | Hydrogenation level [%] | OH functionality [%] |
|---|---|---|---|
| MA-1 | 2,000 | >99 | >98 |

Synthesis of Macromonomer MM-1

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohol are dissolved in methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 mL of MMA are distilled off for azeotropic drying. After cooling to 95° C., $LiOCH_3$ is added and the mixture is heated back to reflux. After the reaction time of about 1 hour, the top temperature has fallen to ~64° C. because of methanol formation. The methanol/MMA azeotrope formed is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter).

Table 3 summarizes the MMA or $LiOCH_3$ amount used for the synthesis of macromonomer MM-1.

TABLE 3

Macroalcohol, MMA and catalyst amounts for the transesterification of the macromonomer.

| Macromonomer | Macroalcohol | Amount MMA [g] | amount $LiOCH_3$ [g] |
|---|---|---|---|
| MM-1 | MA-1 | 500 | 1.5 |

Preparation of Polymer Compound (B) According to the Invention

As described above, the polymer weight-average molecular weights ($M_w$) were measured by gel permeation chromatography (GPC) calibrated using polymethylmethacrylate (PMMA) standards. Tetrahydrofuran (THF) is used as eluent.

Polymer 1 (P1) as Polymer Compound (B):

85 grams of Nexbase 3020, 85 grams of Berylane 230SPP, 140 grams of macromonomer, 107 grams of butyl methacrylate, 28 grams of styrene, 13 grams of lauryl methacrylate, 8 grams of dimethylaminopropylmethacrylamide, and 1 grams of n-dodecylmercaptan were charged into a 2-liter, 4-necked round bottom flask. The reaction mixture was stirred using a C-stirring rod, inerted with nitrogen, and heated to 115° C. Once the reaction mixture reached the setpoint temperature, 0.9 grams of tertbutyl-2-ethyleperoxyhexanoate were fed into the reactor over 3 hours. 0.5 grams of 2,2-di-(tert-butylperoxy)-butane were added in 30 minutes and 3 hours after the previous feed. The reaction was allowed to stir for one hour, and then an additional 132 grams of Nexbase 3020 were added to the reactor and allowed to mix for 1 hour. The polymer obtained has a weight-average molecular weight ($M_w$) of 260,000 g/mol (PMMA standard).

For the example P1, the monomer components add up to 100%. The amount of initiator and chain transfer agent is given relative to the total amount of monomers. Table 4 below shows the monomer composition and reactants to prepare the polymer P1, as well as its final characterization.

TABLE 4

Monomer composition and reactants to prepare polymer P1 and its final characterization

| Monomer composition | Content in wt %, based on the total weight of the monomer composition |
|---|---|
| MM-1 | 38.49 |
| Styrene | 11.01 |
| $C_1$ AMA | 0.24 |
| $C_4$ AMA | 42.0 |
| $C_{12-14}$ AMA | 4.88 |
| DMAPMA | 3.38 |
| Initiator | 0.75 |
| CTA | 0.40 |
| $f_{branch}$ | 1.8 |
| $M_W$ [g/mol] | 260,000 |
| PDI | 2.85 |

Preparation of Nanoparticle Compositions According to the Invention

Dispersion IE1 (with Ball Mill):

The ball mill equipment (Netzsch Laboratory Mill Micro Series) is pre-loaded with 271.3 g NB3020 oil and 26.3 g of P1 while the peristaltic pump is set to 90 rpm and the ball mill to 1000 rpm. Afterwards, 52.5 g of hexagonal boron nitride particles (hBN; SLS d50: 2.7 µm) are given into this solution. The peristaltic pump is adjusted to 130 rpm and the ball mill is set to a rotation speed of 3900 rpm. The dispersion is treated for 120 minutes (0.8 kWh energy is introduced). The particle size distribution (measured in Tegosoft DEC oil using dynamic light scattering equipment, LA-950, Horiba Ltd., Japan) shows a d99 value of 430 nm.

Dispersion IE2 (with Ball Mill):

The ball mill equipment (Netzsch Laboratory Mill Micro Series) is pre-loaded with 271.3 g tetrabutane and 26.3 g of P1 while the peristaltic pump is set to 90 rpm and the ball mill to 1000 rpm. Afterwards, 52.5 g of hexagonal boron nitride particles (hBN; SLS d50: 2.7 µm) are given into this solution. The peristaltic pump is adjusted to 130 rpm and the ball mill is set to a rotation speed of 3900 rpm. The dispersion is treated for 120 minutes (0.7 kWh energy is introduced). The particle size distribution (measured in Tegosoft DEC oil using dynamic light scattering equipment, LA-950, Horiba Ltd., Japan) shows a d99 value of 385 nm.

Dispersion IE3:

10 g of carbon black particles (SLS d50: 17.6 µm) are given into a solution of 83 g NB3020 including 7 g of P1 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 96 nm.

Dispersion IE4 (with Ball Mill):

The ball mill equipment (Netzsch Laboratory Mill Micro Series) is pre-loaded with 259 g NB3020 and 21 g of P1 while the peristaltic pump is set to 90 rpm and the ball mill to 1000 rpm. Afterwards, 70 g of inorganic-fullerene tungsten disulfide particles (IF-$WS_2$; SLS d50: 51.1 µm) are given into this solution. The peristaltic pump is adjusted to 130 rpm and the ball mill is set to a rotation speed of 3900 rpm. The dispersion is treated for 120 minutes (0.7 kWh energy is introduced). The particle size distribution (measured in Tegosoft DEC oil using dynamic light scattering equipment, LA-950, Horiba Ltd., Japan) shows a d99 value of 123 nm.

Dispersion IE5:

20 g of carbon black particles (SLS d50: 17.6 µm) are given into a solution of 166 g NB3043 including 14 g of P1 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 101 nm.

Preparation of Comparative Examples

Dispersion CE1:

2 g of hexagonal boron nitride particles (hBN; SLS d50: 2.7 µm) are given into a solution of 18 g NB3043 while this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d99 value of 1,144 nm.

Dispersion CE2:

2 g of hexagonal boron nitride particles (hBN; SLS d50: 2.7 µm) are given into a solution of 18 g NB3020 while this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d99 value of 3,165 nm.

Dispersion CE3:

2 g of hexagonal boron nitride particles (hBN; SLS d50: 2.7 µm) are given into a solution of 18 g tetrabutane while this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d99 value of 1,322 nm.

Dispersion CE4:

2 g of hexagonal boron nitride particles (hBN; SLS d50: 2.7 µm) are mixed with 2 g of oleyl-alcohol. After addition of 16 g NB3043, this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d99 value of 1,470 nm.

Dispersion CE5:

2 g of hexagonal boron nitride particles (hBN; SLS d50: 2.7 µm) are mixed with 2 g of Triton X-100. After addition of 16 g NB3043, this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d99 value of 1,475 nm.

Dispersion CE6:

2 g of hexagonal boron nitride particles (hBN; SLS d50: 2.7 μm) are mixed with 2 g of Triton X-100. After addition of 16 g NB3020, this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d99 value of 4,357 nm.

Dynamic Light Scattering (DLS)

The particle size distribution was measured in Tegosoft oil using the dynamic light scattering equipment LB-500 produced by Horiba Ltd.

Dynamic light scattering (DLS) is a technique in physics that can be used to determine the size distribution profile of small particles in suspension or polymers in solution. This equipment can be used to measure the particle size of dispersed material (nanoparticles or polymeric spheres, e.g.) in the range from 3 nm to around 6 μm. The measurement is based on the Brownian motion of the particles within the medium and the scattering of incident laser light due to a difference in refraction index of liquid and solid material.

The resulting value is the hydrodynamic diameter of the particle's corresponding sphere. The values d50, d90 and d99 are common standards for discussion, as these describe the hydrodynamic diameter of the particle below which 50%, 90% or 99% of the particles are within the particle size distribution. The lower these values, the better the particle dispersion. Monitoring these values can give a clue about the particle dispersion stability. If the values increase tremendously, the particles are not stabilized enough and may tend to agglomerate and sediment over time resulting in a lack of stability. Depending on the viscosity of the medium, it can be stated, that a d99 value of <500 nm (e.g. for Nexbase base oil) is an indication for a stable dispersion as the particles are held in abeyance over time.

Dynamic Viscosity

The dynamic viscosity was measured with the Physica MCR 300 from Anton Paar using the rotational viscosity method and a single gap cylinder CC 27.

The motor of the viscometer drives a bob inside a fixed cup. The rotational speed of the bob is preset and produces a certain motor torque that is needed to rotate the measuring bob. This torque must overcome the viscous forces of the tested substance and is therefore a measure for its viscosity.

Data are measured at a shear rate of 100 s-1 and 23° C.

Visual Appearance/Stability

A stability test was conducted for each sample by diluting a small amount of concentrate to 1 wt % and 0.1 wt % solution of the nanoparticle, i.e weight % of particle. The dilution was prepared by blending the concentrate in a 50 mL glass bleaker at room temperature for one hour. Each dilution was placed in 5 mL glass vial and allowed to stay at room temperature. The vials were checked after blending, after one week and four weeks thereafter for signs of sedimentation. The sedimentation was classified into 5 categories: no sedimentation (no particles settled at the bottom of the vial), minor sedimentation (some particles start to settle at the bottom of the vial), moderate sedimentation (thin layer at the bottom of the vial), nearly complete sedimentation (almost all particles have settled and supernatant is becoming clear).

Sedimentation over time is a clear stability judgement for dispersions containing particles in any kind. Over time, the particles will sediment to the ground of the vial. This is dependent on their size, mass and the viscosity of the base fluid, in general. A stable dispersion is characterized by the fact, that the particles are homogeneously dispersed in the medium and stabilized by known mechanism.

Thus, stability of nanoparticles in the dispersions is a clear prerequisite for heat transfer properties of nanofluids. The inventive examples provided below show higher stability with different stability tests and good thermal conductivity over a long period of time in comparison to the state-of-the art heat transfer nanofluids. Therefore, the stability tests below were not only conducted at room temperature, which is usually easier to achieve, but also at higher temperatures and longer time periods (e.g. 16 h at 100° C.), which simulates the application of cooling an electric motor with maximum temperatures of about 100° C.

Comparative examples 1 to 3 are simple mixtures of nanoparticles not chemically modified with any kind of surfactant or additive in a base fluid. Comparative examples 4 to 6 are patent examples from U.S. Pat. No. 8,850,803 B2.

TABLE 5

Comparative Examples

| Example # | | Comp. 1 | Comp. 2 | Comp. 3 | Comp. 4 | Comp. 5 | Comp. 6 |
|---|---|---|---|---|---|---|---|
| hBN | [wt %] | 10 | 10 | 10 | 10 | 10 | 10 |
| Oleyl alcohol | [wt %] | | | | 10 | | |
| Triton X-100 | [wt %] | | | | | 10 | 10 |
| NB3043 | [wt %] | 90 | | | 80 | 80 | |
| NB3020 | [wt %] | | 90 | | | | 80 |
| Tetra-butane | [wt %] | | | 90 | | | |
| Stability after 1 day | | +++ | +++ | +++ | +++ | +++ | +++ |
| Stability after 1 week | | +++ | +++ | +++ | +++ | +++ | +++ |
| Stability after 4 weeks | | +++ | +++ | +++ | +++ | +++ | +++ |

○: no sedimentation
Δ: very minor sedimentation
+: minor sedimentation
++: moderate sedimentation
+++: nearly complete sedimentation.

TABLE 6

Inventive Examples

| Example # | | Ex. 1 | Ex. 2 | Ex. 3 | Ex. 4 | Ex. 5 |
|---|---|---|---|---|---|---|
| hBN | [wt %] | 15 | 15 | | | |
| Carbon black | [wt %] | | | 10 | | 10 |
| IF-WS$_2$ | [wt %] | | | | 20 | |
| Polymer P1 | [wt %] | 7.5 | 7.5 | 7 | 6 | 7 |

TABLE 6-continued

Inventive Examples

| Example # | | Ex. 1 | Ex. 2 | Ex. 3 | Ex. 4 | Ex. 5 |
|---|---|---|---|---|---|---|
| NB3020 | [wt %] | 77.5 | | | 74 | |
| Tetrabutane | [wt %] | | 77.5 | 83 | | 83 |
| polymer amount relative to particle | | 50% | 50% | 70% | 30% | 70% |
| Stability after 1 day | | ○ | ○ | ○ | ○ | ○ |
| Stability after 1 week | | Δ | Δ | ○ | Δ | ○ |
| Stability after 4 weeks | | + | + | ○ | + | ○ |

○: no sedimentation
Δ: very minor sedimentation
+: minor sedimentation
++: moderate sedimentation
+++: nearly complete sedimentation.

Stability Test at 100° C. (Change of Viscosity)

The corresponding dispersions were taken and diluted to a 1 wt % and 5 wt % concentration of nanoparticles in the dispersions (see Table 7). Dynamic viscosity and thermal conductivity of these samples was measured. An aliquot was filled into glass vials and stored in an oven at 100° C. for 16 h (overnight). After the dispersion was cooled down to room temperature, its dynamic viscosity and thermal conductivity was measured again.

During the storage at 100° C. dynamic processes between particles and fluid media are enhanced due to higher kinetic energy, which may lead to reagglomeration and or precipitation of nanoparticles in the dispersion. Thus, an increase of viscosity of more than 10% means that the stability of the dispersion is not fulfilled.

As shown below in table 7 the inventors of the present invention were able to prepare nanoparticle dispersions for use as heat transfer fluids with not only good thermal conductivity, but also good stability under given requirements for heat transfer fluids.

In contrast, the comparative examples could not be measured due to their instability after storage for one day, even at room temperature. Thus, a stability test at elevated temperatures (e.g. 16 h at 100° C.), which simulates the application of cooling an electric motor with maximum temperatures of about 100° C., was not even possible.

TABLE 7

Viscosity of the Inventive Examples measured at room temperature (23° C.) before and after storage of the dispersion at 100° C.

| | | Concentration [wt %] | | | | | |
|---|---|---|---|---|---|---|---|
| | | 5 wt % | | 1 wt % | | Base fluid (reference) | |
| Ex No. | Particle | Viscosity [mPas] | Change after 16 h 100° C. | Viscosity [mPas] | Change after 16 h 100° C. | Viscosity [mPas] | Change after 16 h 100° C. |
| Ex. 1 | hBN | 18.0 | Δ | 12.1 | ○ | 10.8* | ○ |
| Ex. 2 | hBN | 9.6 | Δ | 5.9 | ○ | 5.4** | ○ |
| Ex. 3 | Carbon black | 20.9 | ○ | 13.2 | ○ | 10.8* | ○ |
| Ex. 4 | IF-WS$_2$ | 15.6 | ○ | 11.9 | ○ | 10.8* | ○ |

○: no change of viscosity (<5%)
Δ: very minor change of viscosity (>5%)
+: minor change of viscosity (>10%)
++: moderate change of viscosity (>30%)
+++: big change of viscosity (>50%)
*: base fluid NB3020
**: base fluid tetrabutane Determination of Thermal Conductivity by the LAMBDA Device, Flucon GmbH The determination of the thermal conductivity is performed by the hot wire method. The hot wire of the LAMBDA serves as the source of the heat and as transducer at the same time. In order to raise the temperature, the hot-wire is subjected to a constant measuring current; as the surrounding medium warms up, the resistance of the hot-wire will change in accordance with the thermal viscosity of the surrounding medium. Thus, the change of voltage in the hot wire indicates the change of temperature taking place in the surrounding medium. The measuring range is from 10-2000 mW/m*K.

Data are measured after thematicization via PT 100 platinum thermometer of the measuring device in a metal block thermostat at 40° C. and 100° C. These temperatures are chosen, because these temperatures are meaningful for important applications.

As shown in Table 8 below, the use of the nanoparticle compositions according to the invention as heat transfer fluids is advantageous because, not only stability of the nanoparticles in the dispersion is kept over time as shown in Table 6, but also the inventive nanoparticle compositions provide improved thermal conductivity when used as heat transfer fluids compared to the state-of-the-art heat transfer base oil references. Moreover, as shown in Table 7, the addition of nanoparticles does not have a big impact on the viscosity change which was unexpected and is advantageous.

TABLE 8

Results from thermal conductivity measurement at 40° C. before and after storage of the corresponding dispersion at 100° C.

| | | Concentration [wt %] | | | | | |
|---|---|---|---|---|---|---|---|
| | | 5 wt % | | 1 wt % | | Base fluid (reference) | |
| Example No. | Particle | Thermal conductivity 40° C. [mW/m * K] | Change after 16h at 100° C. | Thermal conductivity 40° C. [mW/m * K] | Change after 16h at 100° C. | Thermal conductivity 40° C. [mW/m * K] | Change after 16h at 100° C. |
| Ex. 1 | hBN | 164.2 | ○ | 131.3 | ○ | 126.0* | ○ |
| Ex. 2 | hBN | 140.9 | ○ | 125.2 | ○ | 122.0** | ○ |

TABLE 8-continued

Results from thermal conductivity measurement at 40° C.
before and after storage of the corresponding dispersion at 100° C.

| | | Concentration [wt %] | | | | | |
|---|---|---|---|---|---|---|---|
| | | 5 wt % | | 1 wt % | | Base fluid (reference) | |
| Example No. | Particle | Thermal conductivity 40° C. [mW/m * K] | Change after 16h at 100° C. | Thermal conductivity 40° C. [mW/m * K] | Change after 16h at 100° C. | Thermal conductivity 40° C. [mW/m * K] | Change after 16h at 100° C. |
| Ex. 3 | Carbon black | 140.1 | ○ | 130.4 | ○ | 126.0* | ○ |
| Ex. 4 | IF-WS$_2$ | 132.4 | ○ | 127.6 | ○ | 126.0* | ○ |

○: no change of thermal conductivity (<1%)
Δ: very minor change of thermal conductivity (>1%)
+: minor change of thermal conductivity (>3%)
++: moderate change of thermal conductivity (>5%)
+++: big change of thermal conductivity (>10%)
*: base fluid NB3020
**: base fluid tetrabutane As shown in the experimental part above, it can be concluded that the comparative dispersions cannot be used as heat transfer nanofluids, because they do not even fulfill the stability criteria tests.

In contrast, it has been demonstrated that the nanoparticle compositions of the invention comprising layered structure-based nanoparticles, such as hexagonal boron nitride, carbon black, inorganic fullerene-tungsten disulfide, are stable over a long period of time at conditions close to application (16 h at 100° C.) as heat transfer fluids, without losing dispersion stability (viscosity) and thermal conductivity performance.

Determination of the Reduction in Friction Via Mini Traction Machine

The coefficient of friction was measured using a Mini traction machine named MTM2 from PCS Instruments following the test method described in Table 9 below. SRR refers to the Sliding Roll Ratio. This parameter was maintained constant during the 2 hours test and is defined as $(U_{Ball}-U_{Disc})/U$ wherein $(U_{Ball}-U_{Disc})$ represents the sliding speed and U the entrainment speed, given by $U=(U_{Ball}+U_{Disc})/2$. Stribeck curves for each sample were measured according to protocol in Table 9.

TABLE 9

Protocol to measure the Stribeck curves

| | Method 1 |
|---|---|
| Test Rig | MTM 2 from PCS Instruments |
| Disc | Highly polished stainless Steel AISI 52100 Disc diameter 46 mm |
| Ball | Highly polished stainless Steel AISI 52100 Ball diameter 19.05 mm |
| Speed | 5-2,500 mm/s |
| Temperature | 100° C. |
| Load | 30N |
| SRR | 50% |

According to MTM Method 1, the friction coefficient was recorded over the complete range of speed for each blend and a Stribeck curve is obtained. The friction tests were performed according to these conditions for the formulation listed in Table 10 and results thereof are disclosed in Table 11 below. The listed weight percentages are based on the total weight of the different formulations.

TABLE 10

Formulation according to the invention

| | Particle concentration in formulation | Nexbase ® 3043 | Dispersion IE5 |
|---|---|---|---|
| Formulation IE5-1 | 0.5 wt % | 95 wt % | 5.0 wt % |

To express in % the friction reduction, a quantifiable result can be expressed as a number and is obtained by integration of the friction value curves using the obtained corresponding Stribeck curves in the range of sliding speed 5 mm/s-60 mm/s using the trapezoidal rule. The area corresponds to the "total friction" over the selected speed regime. The smaller the area, the greater the friction-reducing effect of the product examined. The percentage friction reductions were calculated by using the values of the reference base oil Nexbase® 3043, which generates an area of friction of 6.32 mm/s. Positive values indicate a decrease of friction coefficients. Values in relation to the reference oil are compiled in table 11.

TABLE 11

Friction reduction in boundary regime for the
formulation according to the invention compared to base oil

| Example | Friction area from 5-60 mm/s | Reduction of Friction in % |
|---|---|---|
| Reference Nexbase ® 3043 | 6.32 | 0 |
| Formulation IE5-1 | 3.20 | 49.3 |

The experimental result shows great friction reduction performance in comparison to the base oil reference. Indeed, the results of the calculated total friction in the range of sliding speed 5 mm/s-60 mm/s clearly show that the inventive example 1E5 has a much better effect with regard to the reduction in friction than the reference Nexbase® 3043 oil. Nexbase® 3043 is the reference base oil. It has been shown that the use of the nanoparticle composition of the invention not only enhances heat capacity, but also provides friction reduction in an electrical system having metal moving parts.

The invention claimed is:

1. A nanoparticle heat transfer fluid composition obtained by milling a mixture, the mixture comprising one or more nanoparticle compound(s) (A) and one or more amorphous polymer compound(s) (B),
(A) wherein the one or more nanoparticle compound(s) (A) is selected from the group consisting of
  metal or metalloid nitride nanoparticle;
  multi or single walled carbon nanotubes;
  carbon black;
  a metal chalcogenide having a molecular formula $MX_2$, wherein M is a metallic element selected from the group consisting of titanium (Ti), vanadium (V), manganese (Mn), iron (Fe), cobalt (Co), nickel (Ni), copper (Cu), zinc (Zn), zirconium (Zr), niobium (Nb), molybdenum (Mo), tantalum (Ta), tungsten (W), osmium (Os), and combinations thereof, and X is a chalcogen element selected from the group consisting of sulfur(S), oxygen (O), and combinations thereof;
  or a mixture thereof, and
(B) wherein the one or more amorphous polymer compound(s) (B) is obtained by polymerizing a monomer composition comprising:
  a) 1 to 30% by weight, based on the total weight of the monomer composition, of one or more functional monomer selected from the list consisting of:
    a1) aminoalkyl (meth)acrylates and aminoalkyl (meth)acrylamides;
    a2) nitriles of alkyl (meth)acrylic acid and other nitrogen-containing alkyl (meth)acrylates;
    a3) (meth)acrylates of ether alcohols;
    a4) oxiranyl alkyl (meth)acrylate;
    a5) phosphorus-, boron- and/or silicon-containing alkyl (meth)acrylates;
    a6) heterocyclic alkyl (meth)acrylates;
    a7) vinyl halides;
    a8) vinyl esters;
    a9) vinyl monomers containing aromatic groups;
    a10) heterocyclic vinyl compounds;
    a11) vinyl and isoprenyl ethers;
    a12) methacrylic acid and acrylic acid, and
  b) from 30 to 79% by weight of one or more alkyl (meth)acrylate monomer, wherein each of the alkyl group of the one or more alkyl (meth)acrylate monomer is independently linear, cyclic or branched and comprises from 1 to 40 carbon atoms, based on the total weight of the monomer composition, and
  c) from 20 to 60% by weight of the reaction product of one or more ester of (meth)acrylic acid and one or more hydroxylated hydrogenated polybutadiene having a number-average molecular weight ($M_n$) of from 500 to 10,000 g/mol, based on the total weight of the monomer composition,
and wherein the weight ratio of the one or more nanoparticle compound (A) to the one or more amorphous polymer compound(s) (B) is from 9:1 to 1:5.

2. The nanoparticle heat transfer fluid composition according to claim 1, wherein the one or more hydroxylated hydrogenated polybutadiene of component c) has a number-average molecular weight ($M_n$) of 1,500 to 2,100 g/mol, determined by gel permeation chromatography using polybutadiene calibration standards according to DIN 55672-1 with tetrahydrofuran as eluent.

3. The nanoparticle heat transfer fluid composition according to claim 1, wherein the one or more amorphous polymer compound(s) (B) has a weight-average molecular weight ($M_w$) of 10,000 to 1,000,000 g/mol, determined by gel permeation chromatography using polymethylmethacrylate calibration standards and tetrahydrofuran as eluent.

4. The nanoparticle heat transfer fluid composition according to claim 1, wherein the one or more amorphous polymer compound(s) (B) is obtained by polymerizing a monomer composition comprising:
  a) from 1 to 30% by weight of the one or more functional monomer as component a), based on the total weight of the monomer composition; and
  b1) from 30 to 60% by weight, by weight of one or more alkyl (meth)acrylate of formula (I), as first component b):

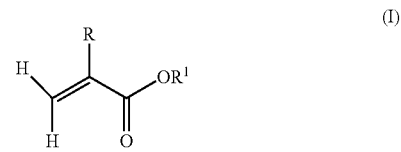

wherein R is hydrogen or methyl, $R^1$ means a linear, branched or cyclic alkyl residue with 1 to 8 carbon atoms, based on the total weight of the monomer composition, and
  b2) from 0 to 20% by weight, of one or more alkyl (meth)acrylate of formula (II), as second component b):

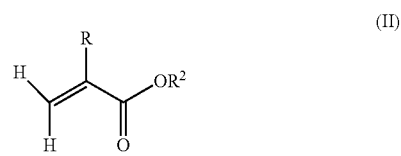

wherein R is hydrogen or methyl, $R^2$ means a linear, branched or cyclic alkyl residue with 9 to 15 carbon atoms, based on the total weight of the monomer composition; and
  b3) from 0 to 20% by weight, of one or more alkyl (meth)acrylate of formula (III), as third component b):

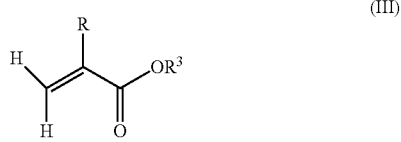

wherein R is hydrogen or methyl, $R^3$ means a linear, branched or cyclic alkyl residue with from 16 to 40 carbon atoms, based on the total weight of the monomer composition; and
  c) from 20 to 60% by weight, of the reaction product of one or more ester of (meth)acrylic acid and one or more hydroxylated hydrogenated polybutadiene having a number-average molecular weight ($M_n$) of from 500 to 10,000 g/mol, based on the total weight of the monomer composition.

5. The nanoparticle heat transfer fluid composition according to claim 1, wherein the weight ratio of the one or more nanoparticle compound(s) (A) to the one or more amorphous polymer compound(s) (B) is from 5:1 to 1:2.

6. The nanoparticle heat transfer fluid composition according to claim 1, wherein the one or more amorphous polymer compound(s) (B) is obtained by polymerizing a monomer composition comprising:
- a1) from 0.5 to 5% by weight of an aminoalkyl (meth)acrylamide as first component a), based on the total weight of the monomer composition;
- a9) from 5 to 15% by weight of a vinyl monomer containing aromatic groups, as second component a), based on the total weight of the monomer composition;
- b1) from 35 to 50% by weight of an alkyl (meth)acrylate monomer of formula (I), as first component b), based on the total weight of the monomer composition;
- b2) from 1 to 10% by weight of an alkyl (meth)acrylate monomer of formula (II), as second component b), based on the total weight of the monomer composition;
- c) from 30 to 50% by weight of an ester of a (meth)acrylic acid and a hydroxylated hydrogenated polybutadiene having a number-average molecular weight (Ma) of from 500 to 10,000 g/mol, as component c), based on the total weight of the monomer composition.

7. The nanoparticle heat transfer fluid composition according to claim 1, wherein the weight contents of monomers a), b) and c) of the monomer composition sum up to 100% by weight, based on the total weight of the monomer composition.

8. The nanoparticle heat transfer fluid composition according to claim 1, wherein the nanoparticle compound (A) is selected from the group consisting of hexagonal boron nitride (hBN) nanoparticle; carbon black, a metal chalcogenide having a molecular formula $MX_2$ wherein the metallic element M is molybdenum (Mo) or tungsten (W) and the chalcogen element X is sulfur(S); or a mixture thereof.

9. The nanoparticle heat transfer fluid composition according to claim 1, wherein the nanoparticle composition further comprises a base fluid (C), which has a kinematic viscosity at 40° C. from 3 cSt to 30 cSt according to ASTM D-445 and a flash point of more than 110° C. according to ASTM D-93.

10. The nanoparticle heat transfer fluid composition according to claim 9, wherein the base fluid is selected from the list consisting of an API Group I base oil, an API Group II base oil, an API Group III base oil, an API Group IV base oil, an API Group V base oil, or a mixture thereof.

11. The nanoparticle heat transfer fluid composition according to claim 9, wherein the nanoparticle composition comprises from 85 to 99.9% by weight of a base fluid (C) and from 0.1 to 15% by weight of (A) and (B), based on the total weight of the nanoparticle heat transfer fluid composition.

12. The nanoparticle heat transfer fluid composition according to claim 9, wherein the amounts of (A), (B) and (C) sum up to 100% by weight, based on the total weight of the nanoparticle heat transfer fluid composition.

13. The nanoparticle heat transfer fluid composition according to claim 1, wherein the nanoparticle composition comprising one or more nanoparticle (A), one or more amorphous polymer compound(s) (B) and optionally the base fluid (C) is milled via a ball mill process.

14. The nanoparticle heat transfer fluid composition according to claim 1, wherein the nanoparticle heat transfer fluid composition further comprises one or more additive component (D) selected from the group consisting of antioxidants, anti-wear additives, pour point depressants, corrosion inhibitors, metal passivators, electrostatic discharge depressants, defoaming agents, seal fix or seal compatibility agents, rust inhibitors, demulsifiers, emulsifiers, friction modifiers, extreme pressure additives, dyes or a mixture thereof.

15. An electrical equipment system comprising the particle heat transfer fluid composition according to claim 1, wherein the electrical equipment system is selected from the group consisting of electric batteries, electric motors, electric vehicle transmission, electric transformers, electric capacitors, fluid-filled transmission lines, fluid-filled power cables, computers and power electronics.

16. The nanoparticle heat transfer fluid composition according to claim 1, wherein the one or more hydroxylated hydrogenated polybutadiene of component c) has a number-average molecular weight ($M_n$) of from 1,900 to 2,100 g/mol determined by gel permeation chromatography using polybutadiene calibration standards according to DIN 55672-1 with tetrahydrofuran as eluent.

17. The nanoparticle heat transfer fluid composition according to claim 1, wherein the one or more amorphous polymer compound(s) (B) has a weight-average molecular weight ($M_w$) of from 100,000 to 500,000 g/mol determined by gel permeation chromatography using polymethylmethacrylate calibration standards and tetrahydrofuran as eluent.

18. The nanoparticle heat transfer fluid composition according to claim 1, wherein the one or more amorphous polymer compound(s) (B) is obtained by polymerizing a monomer composition comprising:
- a) from 10 to 20% by weight of the one or more functional monomer as component a), based on the total weight of the monomer composition; and
- b1) from 35 to 50% by weight of one or more alkyl (meth)acrylate of formula (I), as first component b):

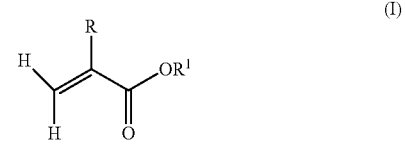

(I)

wherein R is hydrogen or methyl, $R^1$ means a linear, branched or cyclic alkyl residue with from 1 to 4 carbon atoms, based on the total weight of the monomer composition; and
- b2) from 1 to 10% by weight of one or more alkyl (meth)acrylate of formula (II), as second component b):

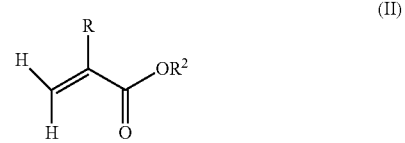

(II)

wherein R is hydrogen or methyl, $R^2$ means a linear, branched or cyclic alkyl residue with from 12 to 14 carbon atoms, based on the total weight of the monomer composition; and
- b3) from 0 to 10% by weight, of one or more alkyl (meth)acrylate of formula (III), as third component b):

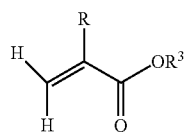

(III)

wherein R is hydrogen or methyl, $R^3$ means a linear, branched or cyclic alkyl residue with from 6 to 20 carbon atoms, based on the total weight of the monomer composition; and c) from 30 to 50% by weight, of the reaction product of one or more ester of (meth)acrylic acid and one or more hydroxylated hydrogenated polybutadiene having a number-average molecular weight ($M_n$) of from 500 to 10,000 g/mol, based on the total weight of the monomer composition.

19. The nanoparticle heat transfer fluid composition according to claim 1, wherein the weight ratio of the one or more nanoparticle compound(s) (A) to the one or more amorphous polymer compound(s) (B) is from 3:1 to 1:2.

20. The nanoparticle heat transfer fluid composition according to claim 1, wherein the one or more amorphous polymer compound(s) (B) is obtained by polymerizing a monomer composition comprising:

a1) from 0.5 to 5% by weight of N-(3-dimethyl-aminopropyl) methacrylamide, as first component a), based on the total weight of the monomer composition;

a9) from 5 to 15% by weight of a styrene monomer containing aromatic groups as second component a), based on the total weight of the monomer composition;

b1) from 35 to 50% by weight of an alkyl (meth)acrylate monomer of methyl methacrylate and/or butyl methacrylate, as first component b), based on the total weight of the monomer composition;

b2) from 1 to 10% by weight of an alkyl (meth)acrylate monomer of lauryl methacrylate, as second component b), based on the total weight of the monomer composition;

c) from 30 to 50% by weight of an ester of a (meth)acrylic acid and an ester of a (meth)acrylic acid and a hydroxylated hydrogenated polybutadiene having a number-average molecular weight (Ma) of from 1,500 to 5,000 g/mol, as component c), based on the total weight of the monomer composition.

21. A method for enhancing heat transfer and thermal conductivity using the nanoparticle heat transfer fluid composition according to claim 1, the method comprising:

carrying out said milling a mixture, the mixture comprising said one or more nanoparticle compound(s) (A) and said one or more amorphous polymer compound(s) (B), so as to obtain said nanoparticle heat transfer fluid composition;

providing the nanoparticle heat transfer fluid composition in a heat transfer fluid that is in a battery or other electrical equipment system having metal moving parts;

thereby enhancing heat transfer and thermal conductivity of the heat transfer fluid.

* * * * *